United States Patent Office 2,860,055
Patented Nov. 11, 1958

2,860,055

PROCESS FOR INHIBITING ENZYME ACTIVITY IN PLANT TISSUE

Eugene F. Jansen, Berkeley, Calif., assignor to the United States of America as represented by the Secretary of Agriculture No Drawing. Application August 20, 1957
Serial No. 679,325

9 Claims. (Cl. 99—154)

(Granted under Title 35, U. S. Code (1952), sec. 266)

A non-exclusive, irrevocable, royalty-free license in the invention herein described, throughout the world for all purposes of the United States government, with the power to grant sub-licenses for such purposes, is hereby granted to the Government of the United States of America.

This invention relates to the preservation of edible plant materials such as fruits and vegetables. More particularly, the invention concerns the treatment of plant materials containing active enzymes whereby to maintain the natural color of these products and otherwise protect them from the deleterious effects which are normally caused by the enzymes therein. The objects of the invention include the provision of processes wherein raw edible plant material is treated with certain agents to inhibit enzyme action whereby the treated plant material can be further processed and stored with maintenance of its original characteristics of color, texture, odor, and flavor. Further objects and advantages of the invention will be evident from the following description.

It is well known that raw plant tissue is subject to deleterious changes particularly when the natural structure is disorganized as by peeling, cutting, comminuting, pitting, pulping, freezing, etc. The deteriorative changes which occur include the development of dark and unnatural colors (browning), softening of tissue, oozing of liquid from the tissue, and development of unnatural odor and taste. These effects are generally attributed to various chemical reactions catalyzed by the enzymes naturally present in the plant tissue. The disorganization of the natural structure disrupts the orderly segregation of substrates and enzymes and thus permits random contact of enzymes and substrates with the untoward results noted above. In any preservation process whether it involves dehydration, freezing, cold storage, canning, or any combination of these, one must provide some means for controlling enzyme action if an acceptable product is to be produced.

In general according to the present invention, raw edible plant material which is normally subject to enzymatic deterioration is treated with an enzyme inhibiting agent of the type hereinafter described. These agents will prevent or at least inhibit enzyme activity in the plant tissure whereby browning and other deleterious changes normally caused by enzyme action are prevented or substantially retarded.

The agents employed in accordance with the invention are aliphatic compounds containing one mercapto radical in a particular spatial relation to another mercapto (or hydroxy) radical. The compounds exhibit a unique ability to inhibit enzyme activity and thus their presence prevents deleterious changes such as browning normally caused by enzyme action. The critical structure which provides this inhibitory effect is the presence of a mercapto group on one carbon atom in the chain and another mercapto group (or hydroxy group) on another carbon atom adjacent to the first or once removed from the first. In other words, the critical structure is any one of the following: (a) two mercapto groups, one on each of two adjacent carbon atoms; (b) two mercapto groups, one on each of two alternate carbon atoms; (c) a mercapto group on one carbon atom and a hydroxy group on an adjacent carbon atom; (d) a mercapto group on one carbon atom and a hydroxy group on an alternate carbon atom. These structures are illustrated below—

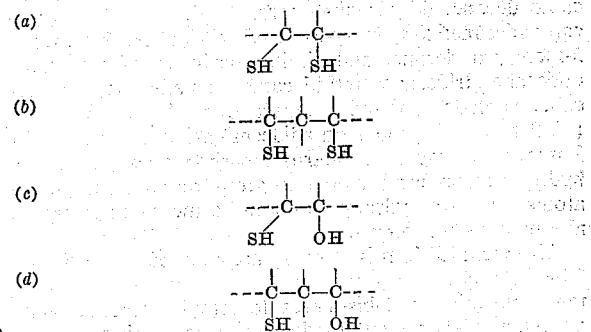

In general, agents of types (a) and (b) are preferred as exhibiting maximum enzyme inactivating properties.

The remainder of the compounds apart from the two mercapto groups (or the mercapto and hydroxy groups) is immaterial and may be an unsubstituted hydrocarbon chain or may include such substituents as hydroxy, carboxy, or both carboxy and hydroxy.

The agents of this invention are generically defined as compounds of the formula

wherein: R is an aliphatic radical of at least 3 carbon atoms selected from the group consisting of hydrocarbon, hydroxy-hydrocarbon, carboxy-hydrocarbon, and hydroxy-carboxy-hydrocarbon; the radical HS— is on one carbon atom of the aliphatic radical, the radical X is on a different carbon atom of the aliphatic radical, the two said carbon atoms being in adjacent to alternate position with respect to one another; and X is a member of the group consisting of —OH and —SH.

Examples of specific compounds coming within the ambit of the invention are set forth below by way of illustration but not limitation.

*Category I.—Compounds where R is hydrocarbon.—*
1,2-dimercapto propane; 1-hydroxy-2-mercapto propane; 2-hydroxy-1-mercapto propane; 1,3-dimercapto propane; 1-hydroxy-3-mercapto propane; 1,2-dimercapto butane; 1-hydroxy-2-mercapto butane; 2-hydroxy-1-mercapto butane; 1,3-dimercapto butane; 1-hydroxy-3-mercapto butane; 3-hydroxy-1-mercapto butane; 2,3-dimercapto butane; 2-hydroxy-3-mercapto butane; 3-hydroxy-2-mercapto butane; 1,2-dimercapto hexane; 1-hydroxy-2-mercapto hexane; 2-hydroxy-1-mercapto hexane; 1,3-dimercapto hexane; 1-hydroxy-3-mercapto hexane; 3-hydroxy-1-mercapto hexane; 2,3-dimercapto hexane; 2-hydroxy-3-mercapto hexane; 3-hydroxy-2-mercapto hexane; 2,4-dimercapto hexane; 2-hydroxy-4-mercapto hexane; 4-hydroxy-2-mercapto hexane; 3,4-dimercapto hexane; 3-hydroxy-4-mercapto hexane; 4-hydroxy-3-mercapto hexane; 1,2-dimercapto octane; 1-hydroxy-2-mercapto octane; 2-hydroxy-1-mercapto octane; 1,3-dimercapto octane; 1-hydroxy-3-mercapto octane; 3-hydroxy-1-mercapto octane; 2,3-dimercapto octane; 2-hydroxy-3-mercapto octane; 3-hydroxy-2-mercapto octane; 2,4-dimercapto octane; 2-hydroxy-4-mercapto octane; 4-hydroxy-2-mercapto octane; 3,4-dimercapto octane; 3-hydroxy-4-mercapto octane; 4-hydroxy-3-mercapto octane; 3,5-dimercapto octane; 3-hydroxy-5-mercapto octane; 5-hydroxy-3-mercapto octane; 4,5-dimercapto octane; 4-hydroxy-5-mercapto octane; 5-hydroxy-4-mercapto octane; 1,2-dimercapto decane; 1-hydroxy-2-mercapto decane; 2-hydroxy-1-mercapto decane; 1,3- dimercapto decane; 1-hydroxy-3-mercapto decane; 3-hydroxy-1-mercapto decane; 2, 3-dimercapto decane; 2-hydroxy-3-mercapto decane; 3-hydroxy-2-mercapto decane; 2, 4-dimercapto decane; 2-hydroxy-4-mercapto decane; 4-hydroxy-2-mercapto decane; 3, 4-dimercapto decane; 3-hydroxy-4-mercapto decane; 4-hydroxy-3-mercapto decane; 3, 5-dimercapto decane; 3-hydroxy-5-mercapto decane; 5-hydroxy-3-mercapto decane; 4, 5-dimercapto decane; 4-hydroxy-5-mercapto decane; 5-hydroxy-4-mercapto decane; 4, 6-dimercapto decane; 4-hydroxy-6-mercapto decane; 6-hydroxy-4-mercapto decane; 5, 6-dimercapto decane; 5-hydroxy-6-mercapto decane; 6-hydroxy-5-mercapto decane, and similar derivates of undecane, dodecane, tridecane, tetradecane, pentadecane, hexadecane, peptadecane and octadecane of the types having (a) 2 mercapto groups on adjacent carbon atoms, or (b) 2 mercapto groups on alternate carbon atoms, or (c) a hydroxy group and a mercapto group on adjacent carbon atoms, or (d) a hydroxy group and a mercapto group on alternate carbon atoms.

Also included in this category are compounds such as—1-bis-mercaptomethyl ethane; 1-hydroxymethyl-1-mercaptomethyl ethane; 1-bis-mercaptomethyl propane; 1-hydroxymethyl-1-mercaptomethyl propane; 2-bis-mercaptomethyl propane; 2-hydroxymethyl-2-mercaptomethyl propane; 1-bis-mercaptomethyl butane; 1-hydroxymethyl-1-mercaptomethyl butane; 2-bis-mercaptomethyl butane; 2-hydroxymethyl-2-mercaptomethyl butane; 1-bis-mercaptomethyl pentane; 1-hydroxymethyl-1-mercaptomethyl pentane; 2-bis-mercaptomethyl pentane; 2-hydroxymethyl-2-mercaptomethyl pentane; 3-bis-mercaptomethyl pentane; 3-hydroxymethyl-3-mercaptomethyl pentane; 1-bis-mercaptomethyl hexane; 1-hydroxymethyl-1-mercaptomethyl hexane; 2-bis-mercaptomethyl hexane; 2-hydroxymethyl-2-mercaptomethyl hexane; 3-bis-mercaptomethyl hexane; 3-hydroxymethyl-3-mercaptomethyl hexane, and similar compounds of the structure

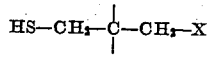

where the central carbon atom is part of an aliphatic hydrocarbon chain.

Category I also includes compounds of the structures—

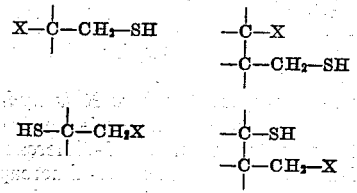

wherein the array of carbon atoms shown in each formula is part of an aliphatic hydrocarbon chain. Typical components in this area are: 2-hydroxy-2-mercaptomethyl propane; 2-mercapto-2-mercaptomethyl propane; 2-hydroxymethyl-2-mercaptomethyl propane; 2-hydroxy-3-mercaptomethyl butane; 2 - hydroxymethyl - 3 - mercapto butane; and 2-mercapto-3-mercaptomethyl butane.

*Category II.—Compounds wherein R is hydroxy-hydrocarbon.*—2, 3-dimercapto propanol; 2-hydroxy-3-mercapto propanol; 3-hydroxy-2-mercapto propanol; 2, 3-dimercapto butanol; 2-hydroxy-3-mercapto butanol; 3-hydroxy-2-mercapto butanol; 2, 4-dimercapto butanol; 2-hydroxy-4-mercapto butanol; 4-hydroxy-2-mercapto butanol; 3, 4-dimercapto butanol; 3-hydroxy-4-mercapto butanol; 2, 3-dimercapto pentanol; 2-hydroxy-3-mercapto pentanol; 3-hydroxy-2-mercapto pentanol; 2, 4-dimercapto pentanol; 2-hydroxy-4-mercapto pentanol; 4-hydroxy-2-mercapto pentanol; 3, 4-dimercapto pentanol; 3-hydroxy-4-mercapto pentanol; 4-hydroxy-3-mercapto pentanol; 3, 5-dimercapto pentanol; 3-hydroxy-5-mercapto pentanol; 5-hydroxy-3-mercapto pentanol; 4, 5-dimercapto pentanol; 4-hydroxy-5-mercapto pentanol; 5-hydroxy-4-mercapto pentanol; 2, 3-dimercapto hexanol; 2-hydroxy-3-mercapto hexanol; 3-hydroxy-2-mercapto hexanol; 2, 4-dimercapto hexanol; 2-hydroxy-4-mercapto hexanol; 4-hydroxy-2-mercapto hexanol; 3, 4-dimercapto hexanol; 3-hydroxy-4-mercapto hexanol; 4-hydroxy-3-mercapto hexanol; 3, 5-dimercapto hexanol; 3-hydroxy-5-mercapto hexanol; 5-hydroxy-3-mercapto hexanol; 4, 5-dimercapto hexanol; 4-hydroxy-5-mercapto hexanol; 5-hydroxy-4-mercapto hexanol; 4, 6-dimercapto hexanol; 4-hydroxy-6-mercapto hexanol; 6-hydroxy-4-mercapto hexanol; 5, 6-dimercapto hexanol; 5-hydroxy-6-mercapto hexanol; 6-hydroxy-5-mercapto hexanol, and similar derivatives of heptanol, octanol, monanol, decanol, undecanol, dodecanol, tridecanol, tetradecanol, pentadecanol, hexadecanol, heptadecanol, and octadecanol of the types having (a) two mercapto groups on adjacent carbon atoms or (b) two mercapto groups on alternate carbon atoms or (c) a hydroxy group and a mercapto group on adjacent carbon atoms or (d) a hydroxy group and a mercapto group on alternate carbon atoms.

Also included in this category are such compounds as 2-bis-mercaptomethyl ethanol; 2-hydroxymethyl-2-mercaptomethyl ethanol; 2-bis-mercaptomethyl propanol; 2-hydroxymethyl-2-mercaptomethyl propanol; 3-bis-mercaptomethyl propanol; 3 - hydroxymethyl - 3 - mercaptomethyl propanol; 2-bis-mercaptomethyl butanol; 2-hydroxymethyl-2-mercaptomethyl butanol; 3-bis-mercaptomethyl butanol; 3-hydroxymethyl-3-mercaptomethyl butanol; 4-bis-mercaptomethyl butanol; 4-hydroxymethyl-4-mercaptomethyl butanol, and similar compounds of the structure

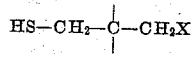

wherein the central carbon atom in the formula is part of an aliphatic alcohol.

Category II also includes compounds of the structures

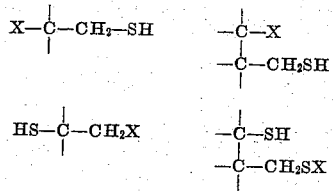

wherein the array of carbon atoms in each formula is part of an aliphatic alcohol. Typical compounds in this area are: 2-hydroxy-2-mercaptomethyl propanol; 2-hydroxymethyl-2-mercapto propanol; 2-mercaptomethyl-2-mercapto propanol; 2-mercaptomethyl-butane-1,3-diol; 2-mercaptomethyl-3-mercapto butanol; and 2-hydroxymethyl-3-mercapto butanol.

This category also includes compounds derived from polyhydric alcohols, that is, R may contain more than one hydroxy radical. Typical compounds in this area are: 2,2-bis-mercaptomethyl-propane-1,3-diol; 1-mercapto-hexane-2,3,4,5,6-pentol; and 1,2-dimercapto-hexane-3,4,5,6-tetrol.

*Category III.—Compounds where R is carboxy-hydrocarbon.*—2,4-dimercapto butyric acid, 2-hydroxy-4-mercapto butyric acid; 4-hydroxy-2-mercapto butyric acid; 2,3-dimercapto butyric acid; 2-hydroxy-3-mercapto butyric acid; 3-hydroxy-2-mercapto butyric acid; 3,4-dimercapto butyric acid; 3-hydroxy-4-mercapto butyric acid; 4-hydroxy-3-mercapto butyric acid; 2,4-dimercapto valeric acid; 2-hydroxy-4-mercapto valeric acid; 4-hydroxy-2-mercapto valeric acid; 2,3-dimercapto valeric acid; 2-hydroxy-3-mercapto valeric acid; 3-hydroxy-2-mercapto valeric acid; 3,4-dimercapto valeric acid; 3-hydroxy-4-mercapto valeric acid; 4-hydroxy-3-mercapto valeric acid; 3,5-dimercapto valeric acid; 3-hydroxy-5-mercapto valeric acid; 5-hydroxy-3-mercapto valeric acid; 4,5-dimercapto valeric acid; 4-hydroxy-5-mercapto valeric acid; 5-hydroxy-4-mercapto valeric acid; 2,3-dimercapto caproic acid; 2-hydroxy-3-mercapto caproic acid; 3-hydroxy-2-mercapto caproic acid; 2,3-dimercapto caprylic acid; 2-hydroxy-4-mercapto caproic acid; 4-hydroxy-2-mercapto caproic acid; 3,4-dimercapto caproic acid; 3-hydroxy-4-mercapto caproic acid; 4-hydroxy-3-mercapto caproic acid; 3,5-dimercapto caproic acid; 3-hydroxy-5-mercapto caproic acid; 5-hydroxy-3-mercapto caproic acid; 4,5-dimercapto caproic acid; 4-hydroxy-5-mercapto caproic acid; 5-hydroxy-3-mercapto caproic acid; 4,6-dimercapto caproic acid; 4-hydroxy-6-mercapto caproic acid; 6-hydroxy-4-mercapto caproic acid; 5,6-dimercapto caproic acid; 5-hydroxy-6-mercapto caproic acid; 6-hydroxy-5-mercapto capric acid; 4-hydroxy-3-mercapto capric acid; hydroxy-3-mercapto caprylic acid; 3-hydroxy-2-mercapto caprylic acid; 2,4-dimercapto caprylic acid; 2-hydroxy-4-mercapto caprylic acid; 4-hydroxy-2-mercapto caprylic acid; 3,4-dimercapto caprylic acid; 3-hydroxy-4-mercapto caprylic acid; 4-hydroxy-3-mercapto caprylic acid; 3,5-dimercapto caprylic acid; 3-hydroxy-5-mercapto caprylic acid; 5-hydroxy-3-mercapto caprylic acid; 4,5-dimercapto caprylic acid; 4-hydroxy-5-mercapto caprylic acid; 5-hydroxy-4-mercapto caprylic acid; 4,6-dimercapto caprylic acid; 4-hydroxy-6-mercapto caprylic acid; 6-hydroxy-4-mercapto caprylic acid; 5,6-dimercapto caprylic acid; 5-hydroxy-6-mercapto caprylic acid; 6-hydroxy-5-mercapto caprylic acid; 5,7-dimercapto caprylic acid; 5-hydroxy-7-mercapto caprylic acid; 7-hydroxy-5-mercapto caprylic acid; 6,7-dimercapto caprylic acid; 6-hydroxy-7-mercapto caprylic acid; 7-hydroxy-6-mercapto caprylic acid; 6,8-dimercapto caprylic acid; 6-hydroxy-8-mercapto caprylic acid; 8-hydroxy-6-mercapto caprylic acid; 7,8-dimercapto caprylic acid; 7-hydroxy-8-mercapto caprylic acid; 8-hydroxy-7-mercapto caprylic acid; 2,3-dimercapto capric acid; 2-hydroxy-3-mercapto capric acid; 3-hydroxy-2-mercapto capric acid; 2,4-dimercapto capric acid; 2-hydroxy-4-mercapto capric acid; 4-hydroxy-2-mercapto capric acid; 3,4-dimercapto capric acid; 3-hydroxy-4-mercapto capric acid; 4-hydroxy-3-mercapto capric acid; 3,5-dimercapto capric acid; 3-hydroxy-5-mercapto capric acid; 4,5-dimercapto capric acid; 4-hydroxy-5-mercapto capric acid; 5-hydroxy-4-mercapto capric acid; 4,6-dimercapto capric acid; 4-hydroxy-6-mercapto capric acid; 6-hydroxy-4-mercapto capric acid; 5,6-dimercapto capric acid; 5-hydroxy-6-mercapto capric acid; 6-hydroxy-5-mercapto capric acid; 5,7-dimercapto capric acid; 5-hydroxy-7-mercapto capric acid; 7-hydroxy-5-mercapto capric acid; 6,7-dimercapto capric acid; 6-hydroxy-7-mercapto capric acid; 7-hydroxy-6-mercapto capric acid; 6,8-dimercapto capric acid; 6-hydroxy-8-mercapto capric acid; 8-hydroxy-6-mercapto capric acid; 7,8-dimercapto capric acid; 7-hydroxy-8-mercapto capric acid; 8-hydroxy-7-mercapto capric acid; 7,9-dimercapto capric acid; 7-hydroxy-9-mercapto capric acid; 9-hydroxy-8-mercapto capric acid; 8,10-dimercapto capric acid; 8-hydroxy-10-mercapto capric acid; 10-hydroxy-8-mercapto capric acid; 9,10-dimercapto capric acid; 9-hydroxy-10-mercapto capric acid; 10-hydroxy-9-mercapto capric acid, and similar derivatives of undecanoic acid, lauric acid, myristic acid, palmitic acid, and stearic acid of the types having (a) two mercapto groups on adjacent carbon atoms, or (b) two mercapto groups on alternate carbon atoms, or (c) a hydroxy group and a mercapto on adjacent carbon atoms, or (d) a hydroxy group and a mercapto group on alternate carbon atoms. Typical examples are 10,11-dimercapto undecanoic acid, 4,5-dimercapto lauric acid, 9,10-dimercapto lauric acid, 9,10-dimercapto plamitic acid, and 9,10-dimercapto stearic acid.

Also included in this category are compounds such as 2-bis-mercaptomethyl acetic acid; 2-hydroxymethyl-2-mercaptomethyl acetic acid; 2-bis-mercaptomethylpropionic acid; 2-hydroxymethyl-2-mercaptomethyl propionic acid; 3-bis-mercaptomethyl propionic acid; 3-hydroxymethyl-3-mercaptomethyl propionic acid, and similar compounds of the formula

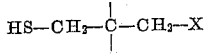

wherein the central carbon atom in the formula is part of an aliphatic carboxylic acid.

Category III also includes compounds of the structures—

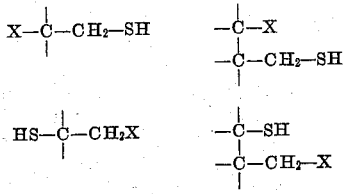

wherein the array of carbon atoms shown in each formula is part of an aliphatic carboxylic acid. Typical compounds in this area are 2-hydroxy-2-mercaptomethyl propionic aicd; 2-hydroxymethyl-2-mercapto propionic acid; 2-mercapto-2-mercaptomethyl propionic acid; 3-hydroxy-2-mercaptomethyl butyric acid; 2-hydroxymethyl-3-mercapto butyric acid; and 2-mercaptomethyl-3-mercapto butyric acid.

This category also includes compounds derived from polycarboxylic acids, that is, R in the formula above may contain more than one carboxy group. Typical compounds in this area are—2,3-dimercapto-butane-1,4-dicarboxylic acid; 2-hydroxy-3-mercaptobutane-1,4-dicarboxylic acid; and 2,2-bis-mercaptomethylpropane-1,3-dicarboxylic acid.

*Category IV.—Compounds where R contains hydroxy and carboxy substituents.*—Compounds included in this category are, for example: 2, 3-dihydroxy-4-mercapto butyric acid; 3, 4-dimercapto-2-hydroxy butyric acid; 6-mercapto gluconic acid; and 2, 2-bis-mercapto-methyl-3-hydroxy propionic acid.

It is understood that the compounds containing carboxyl radicals may be employed in the acid form or in the form of salts with nontoxic metals such as sodium, potassium, calcium, or magnesium.

The expression "mercapto" as employed herein refers to the radical —SH. The expression "carbon atoms in adjacent position" refers to carbon atoms directly joined to one another. The expression "carbon atoms in alternate position" refers to two carbon atoms which are joined through an intervening carbon atoms as the 1, 3 carbons in propane.

Practice of the present invention essentially involves treating the raw plant material with any of the described agents. The agents may be applied in solution form to the plant material by such conventional methods as dipping or spraying. To get maximum penetration of the treating solution into the plant material, vacuum or pressure, or both in sequence, may be applied. Where the plant material is in comminuted, pulp, or juice form the selected agent may be simply incorporated into the mass of plant material. Instead of using solutions of the agents they may be applied to the surfaces of plant materials as such or diluted with a harmless carrier such as cereal meals, cereal bran, starch, flour, sucrose, glucose, sorbitol, dextrin, pectin, dextran, alginic acid, edible oil, salt, dehydrated milk, dehydrated whey, powdered dehydrated fruit or vegetable juices, etc.

After the selected agent has been applied to the plant material, the treated material may be preserved by any conventional technique including cold storage, freezing, concentration, dehydration, canning, brining, smoking, etc., including combinations of these such as dehydrofreezing and dehydrocanning.

Illustrative examples of methods of applying the agents to various types of produce are set forth below although it is to be understood that the method of applying the agents does not form any critical part of the invention.

*Example I*

Potatoes are peeled, washed then dipped in an aqueous solution of one of the described agents in a concentration of about 0.01 to 5%. The potatoes are removed from the bath, drained, packaged in wax paper cartons and stored at about 32–50° F. Such storage is for temporary preservation (about a week). If desired, the potatoes may be sliced prior to dipping to provide a product instantly available for making French-fried potatoes.

Example II

Apples are peeled, cored, sliced then dipped in a solution of one of the described agents in a concentration of about 0.01 to 5%. The slices are removed from the bath, drained, packaged in cartons (with or without added sugar), frozen, and maintained in frozen storage.

The types of treatment shown above in Examples I and II are, of course, applicable to many other classes of produce such as peaches, pears, apricots, berries, peas, beans, cabbage, broccoli, cauliflower, etc. It is also evident that the enzyme inhibiting solution can be applied to the plant material by spraying instead of dipping.

Where the produce to be preserved is in comminuted or liquefied form as a sauce, puree, pulp, nectar, juice, concentrated juice, etc., the selected agent may be simply incorporated into the material prior to further treatment as freezing concentration, dehydration, etc. Moreover, the enzyme-inhibiting agent may be applied to the produce prior to comminuting to prevent darkening during this step of the processing. Such technique is further described below:

Example III

Fresh apricots are washed, dipped in a solution of one of the described agents to establish a concentration of at least 0.1% thereof in the puree. Sugar may also be added to sweeten the product if desired. The puree is then packaged and frozen.

Example IV

Peaches are washed, peeled and halved. The halves are then immersed in an aqueous 0.01 to 5% solution of one of the described agents. The halves are left in the solution until ready for canning whereby during this period browning of the fruit is prevented. In canning the product the peach halves are removed from the bath, drained, placed in cans with syrup, the cans being then sealed and heat processed in the usual manner to ensure sterility.

The above procedure may be applied to other forms of plant material to protect the color thereof in the interim between the time when the product is peeled, sliced, comminuted, etc. and the time when the product is canned and the enzymes thus inactivated.

It is sometimes desirable to use an impregnation technique to cause the solution of the enzyme inhibiting agent to penetrate deep into the tissue of the plant material and thus protect inner parts of the tissue as well as the surface from enzymic discoloration. Such impregnation can be readily accomplished by immersing the product in a solution of the enzyme-inhibiting agent then subjecting the system to vacuum to draw air or other gases out of the plant tissue to allow deep penetration of the solution. This technique is particularly effective with fruit such as apples and pears which normally contain a considerable amount of air in the interstices of the fruit tissue. The solution used for impregnating may contain sugar or other flavoring material to, at the same time, sweeten or otherwise flavor the fruit. The following example illustrates such a technique.

Example V

Apples are peeled, cored and sliced. The slices are placed in a jar and covered with a solution containing 60% sucrose and about 0.1% of any one of the described agents. A vacuum is then applied over the surface of the liquid and maintained until most of the air is exhausted from the apple tissue, i. e., until frothing and bubbling cease. The vacuum is then broken and after remaining in the syrup a few minutes the apple slices are removed, drained, packaged, and frozen.

Example VI

Apples are washed thoroughly, dipped in a solution of one of the described enzyme-inhibiting agents then mashed. The mashed product is screened to remove skins, pits, tough membranes, stems, etc. The screened puree is then admixed with enough of the described agent to establish a concentration of 0.01 to 5% in the puree. The puree is then dehydrated to a solid state employing the procedure of Example III in Pat. No. 2,785,077.

Example VII

Fresh Elberta peaches were peeled, sliced and packed into No. 2 cans. Each can contained 400 g. peach slices and 172 g. of a 50% sugar syrup. In the control pack, the syrup contained no added ingredient. In another pack the syrup contained 0.1% ascorbic acid as representing a conventional antioxidant. In a third pack, the syrup contained 0.1% of 3,3'-dimercaptoisobutyric acid (also known as 3,3'-dithiolisobutyric acid) as a typical agent contemplated by this invention.

The canned peaches were then frozen and stored at 0° F. for 6 months. After this period of storage, the cans were immersed in water at 70° F. for 2½ hours to thaw the contents. The thawed peach slices were then removed from the cans and exposed to the atmosphere for 4 hours. The color of the slices before and after this exposure to the atmosphere was measured with a Hunter color meter. In these tests, the slices were exposed to white light and the amount of light reflected was measured by the instrument as an index of the lightness of the slices; the higher the reading the lighter the object.

The results obtained are tabulated below—

| Expt. | Agent | Lightness zero time, percent | Lightness 4 hrs. exp. to air, percent | Difference (amount of darkening) |
|---|---|---|---|---|
| 1 | None (control) | 51 | 31 | 20 |
| 2 | Ascorbic acid (conventional) | 57 | 36 | 21 |
| 3 | 3,3'-dimercaptoisobutyric acid | 56 | 55 | 1 |

It is evident from the above data that in Expt. 3, using an agent in accordance with the invention, the peach slices did not significantly darken on standing 4 hours exposed to air whereas the products of Expts. 1 and 2 darkened to a material extent.

Example VIII

Fresh peach slices were cut in cross section. One exposed face of each slice was sprayed with a 0.1% solution of 6,8-dimercapto caprylic acid, the other exposed face of each slice was sprayed with water. The treated slices were allowed to stand in air and their color observed from time to time. It was noted that the surfaces sprayed with water darkened in 20 minutes whereas the surfaces sprayed with the mercapto compound retained their natural color for 1 to 1½ hours.

The invention may be applied to any type of edible plant material as, for example, potatoes, sweetpotatoes, carrots, peas, beans, cabbage, spinach, broccoli, avocados, mushrooms, cauliflower, squash, peaches, apples, pears, nectarines, plums, apricots, walnut meats, figs, dates, etc. The proportion of inactivating agent to be applied in any particular case will depend on such factors as the type of produce in question, the degree of stability desired, the effectiveness of the agent selected, and so forth. For instance, produce which exhibits very active browning tendencies, e. g., apples, will require more of the stabilizing agent than will a material of lesser browning tendencies such as string beans. Moreover, if the end sought is merely a temporary stabilization less of the stabilizing agent will be needed than where the aim is to preserve a product indefinitely. In any particular case, the optimum amount of agent can easily be determined by conducting pilot experiments on small lots of the fruit or vegetable in question employing, for example, accelerated storage conditions to obtain more rapid evaluation. In any event the amount of agent is not critical as any proportion of agent will result in improvement of stability. Usually, the agent is applied to the plant material as a solution having a concentration of about 0.01 to 5%, or, if the agent is added to the plant material enough is employed so that the composite material contains about the aforesaid proportion of the agent. As described above, one method of applying the stabilizing agent to the fruit involves use of a solution of the agent. Generally water is used as the solvent where the selected agent is soluble therein. With the agents of low water-solubility one may employ other solvents as for example ethyl alcohol, mixtures of ethyl alcohol and water, ethylene glycol, glycerine, edible oils, etc.

Having thus described my invention, I claim:

1. A method comprising subjecting raw edible plant material normally subject to enzymatic deterioration to a compound of the formula—

HS—R—X wherein R is an aliphatic radical of at least 3 carbon atoms selected from the group consisting of hydrocarbon, hydroxy-hydrocarbon, carboxy-hydrocarbon, and hydroxycarboxy-hydrocarbon, the radical HS— is on one carbon atom of the aliphatic radical, the radical X is on a different carbon atom of the aliphatic radical, the two said carbon atoms being in adjacent to alternate position relative to one another, and X is a member of the group consisting of —OH and —SH, the said compound being applied in a concentration of about from 0.01 to 5%, whereby to inhibit the enzymatic deterioration.

2. The method of claim 1 wherein X is —SH.
3. The method of claim 1 wherein X is —SH and R is hydrocarbon.
4. The method of claim 1 wherein X is —SH and R is hydroxy-hydrocarbon.
5. The method of claim 1 wherein X is —SH and R is carboxy-hydrocarbon.
6. The method of claim 1 wherein X is —SH and R is hydroxycarboxy-hydrocarbon.
7. The method of claim 1 wherein the compound is 3,3'-dimercapto isobutyric acid.
8. The method of claim 1 wherein the compound is 6,8-dimercapto caprylic acid.
9. The method of claim 1 wherein the compound is 2,3-dimercapto propanol.

References Cited in the file of this patent

UNITED STATES PATENTS 2,011,465   Balls et al. ------------ Aug. 13, 1935